CLOSURES FOR CONTAINERS

Original Filed Dec. 8, 1965 3 Sheets-Sheet 1

United States Patent Office

Re. 26,831
Reissued Mar. 17, 1970

26,831

CLOSURES FOR CONTAINERS

Eugene J. Treanor, The Cloisters, 94 Berrow Road, Burnham-on-Sea, Somerset, England Original No. 3,348,717, dated Oct. 24, 1967, Ser. No. 523,813, Dec. 8, 1965. Application for reissue Nov. 21, 1968, Ser. No. 786,496
Claims priority, application Great Britain, Dec. 9, 1964, 50,031/64; Apr. 15, 1965, 16,141/65
Int. Cl. A61j *1/00*
U.S. Cl. 215—9 5 Claims

Matter enclosed in heavy brackets [ ] appears in the original patent but forms no part of this reissue specification; matter printed in italics indicates the additions made by reissue.

ABSTRACT OF THE DISCLOSURE

A container is provided with a cap which is difficult for a child to remove, the container and cap having spigot-and-slot fittings of the bayonet type but with two or more sockets for each spigot. The cap can only be removed by pushing it inwards and twisting it until the spigot has cleared all the slots. If the cap is pushed in, rotated only a little way, and then released any further twisting causes the spigot to drop into another socket. In an alternative the cap engages a tubular neck which screws tightly onto an existing container.

Detailed description

Figure 1:
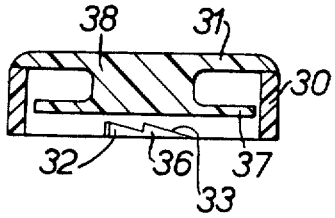

This invention relates to containers and closures therefor.

Many substances for domestic use are potentially dangerous to children. For example many medicines would be dangerous if taken by children, as would many cleaning materials. The substances concerned are usually stored in containers, and it is normally necessary to keep these containers in places inaccessible to children. When such a substance is in use, however, it is usually necessary for an adult to watch that children do not obtain access to the substance in the container. Should the person be unexpectedly called away, as for example when the telephone or door-bell rings, a child may be left alone with the container and inadvertently do itself some harm. With the aid of the present invention it is possible to provide a container with a closure which can easily be opened and closed by an adult but which is difficult or impossible for a child to open, so that if a child is left with a closed container it is unlikely to be able to open the container.

The form of closure which is the subject of this invention is not restricted to its use in conjunction with containers for substances which are potentially dangerous to children, but may be used in conjunction with containers for other substances as well.

According to the present invention there is provided in combination a closure for a container and retaining means for the closure which retaining means is on the container or is adapted to be secured to the container, two sets of locking formations, one set on the closure and one set on the retaining means, the sets of locking formations being capable of mutual engagement and disengagement, one set of locking formations comprising a spigot and the other set presenting a row of at least two sockets, and the closure being rotatable relatively to the retaining means so as to bring the spigot into register with each of the sockets in turn, and spring means operative when the spigot is in register with any sockets to urge the spigot into that socket, the arrangement being such that in use when the spigot is in any of the sockets the closure cannot normally be removed from the container and when the spigot is in one particular socket, the locking socket, the closure can only normally be removed after it has been manipulated to remove the spigot from this locking socket, against the action of the resilient means, and rotated so that the spigot passes at least one other socket before it is brought out of register with the set of locking formations presenting the row of sockets.

The invention is in part based on the observation that whilst young children may be capable of pushing a closure towards a container, against the action of the resilient means, and whilst they may be capable of rotating the closure of a screw-topped container, they are in general incapable of the sustained push and rotation necessary to remove a closure embodying the present invention. By the time a child has reached the age at which it can do this it is normally about 6 years old and can be taught not to remove the closure from a container without permission.

When the spigot is engaged in the locking socket it is necessary, before the closure can be freed, to move the closure against the action of the spring means and to rotate the spigot beyond the end of the row of sockets. It may happen that in struggling to remove the closure a child moves the closure against the action of the spring means and rotates the closure to a small extent. When the child releases the closure again, however, the spigot will engage in a socket next to or near the locking socket, and having failed to remove the closure in this way may lose interest or attempt to remove the closure by some other method.

It must be understood that the terms spigot and socket are used in the most general sense to denote any forms of mutually engageable projection and recess. Further, it is to be understood that reference to the ways in which the closure cannot be manipulated are qualified by the word normally because in practice it might be possible to manipuate a closure in accordance with the invention in some other manner if undue force were used or the closure or retaining means were damaged.

The retaining means may form an integral part of the container, or it may comprise a separate component secured to the container, a preferred form of component being tubular and provided with securing means enabling it to be secured to the container. The component may, in effect, constitute the neck or an extension of the neck of the container and may thus constitute the mouth of the container. This is not essential, however, and the neck of the container may project right through the tubular component.

The arrangement is preferably such that in normal use it is only possible to bring the spigot into register with the row of sockets from one end of the row. The locking socket is then usually at the other end of the row, the locking socket being a socket such that when the spigot is in it a relatively high degree of security is achieved. Nevertheless it is not essential for this arrangement to be used, and it is within the scope of the invention to provide an arrangement in which it is possible to bring the spigot into register with the row of sockets from either end of the row at will. The locking socket would then be a socket in or near the middle of the row.

Figure 2:
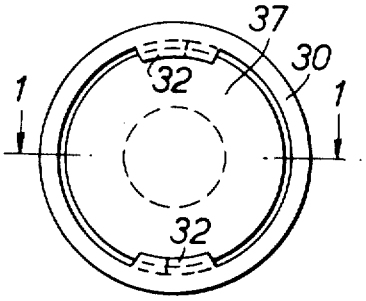
Figure 3:
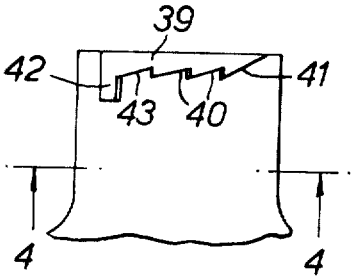
Figure 4:
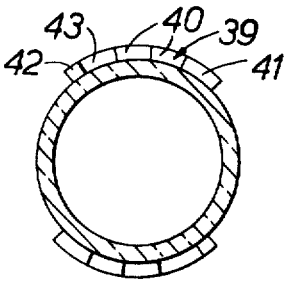
Figure 5:
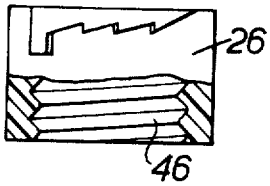
Figure 6:
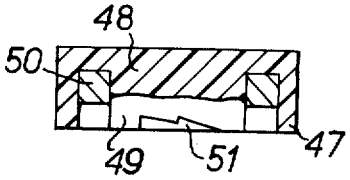
Figure 7:
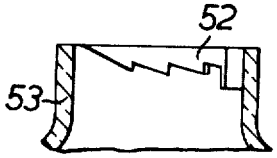
Figure 8:
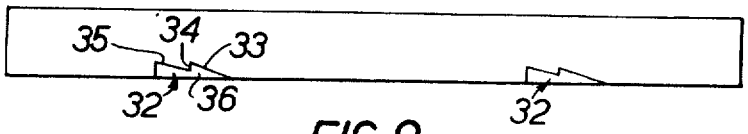
Figure 9:
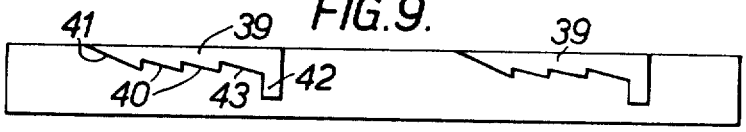
Figure 10:
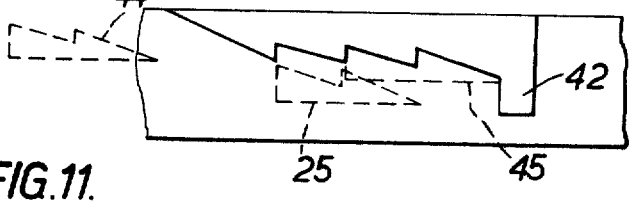
Figure 11:
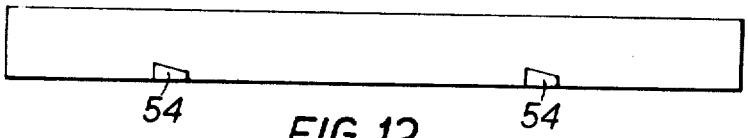
Figure 12:
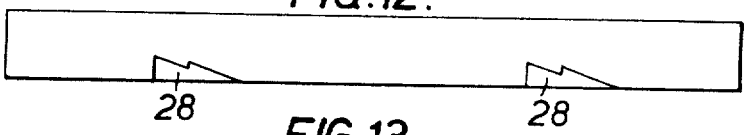
Figure 13:
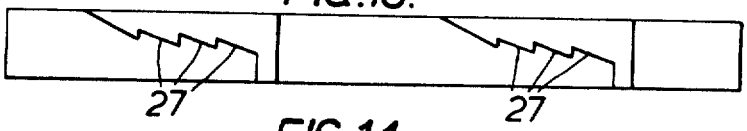
Figure 14:
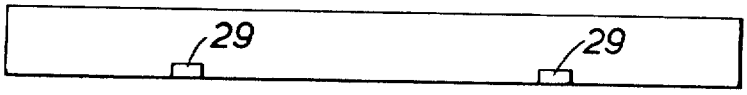
Figure 15:
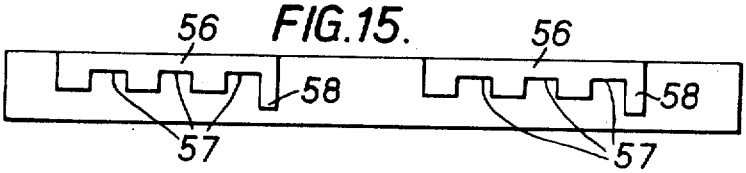
Figure 16:
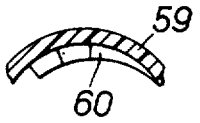
Figure 17:
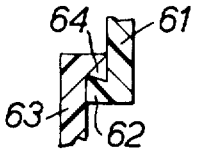
Figure 18:
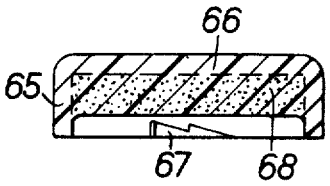
Figure 19:
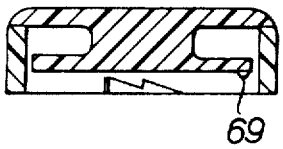
Figure 20:
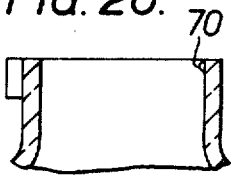
Figure 21:
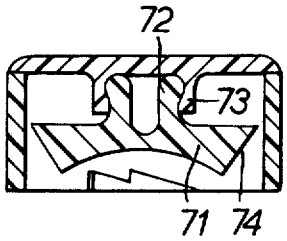

The invention will now be more particularly described with reference to the accompanying drawings, many of which are largely diagrammatic or schematic, and in which:

FIGURE 1 as a section through a closure along the line 1—1 of FIGURE 2,

FIGURE 2 is an underneath plan of the closure shown in FIGURE 1,

FIGURE 3 is an elevation of the neck of a container with locking formations for co-operation with the closure shown in FIGURES 1 and 2, FIGURE 4 is a section along the line 4—4 of FIGURE 3, FIGURE 5 is an elevation of a component adapted to be secured to a container and having locking formations for co-operation with those of the closure shown in FIGURES 1 and 2, the lower part being broken away to reveal the interior, FIGURE 6 is an elevation of another form of closure, largely in section, FIGURE 7 is a section through the neck of a container with locking formations for co-operation with those of the closure shown in FIGURE 6, FIGURE 8 is a developed view illustrating the shape of the locking formations on the closures shown in FIGURES 1, 2 and 6, FIGURE 9 is a developed view illustrating the shape of the locking formations on the containers shown in FIGURES 3, 4 and 7 and on the component shown in FIGURE 5, FIGURE 10 shows part of FIGURE 9 to an enlarged scale and shows in dotted lines the relative positions assumed by the locking formations of FIGURE 8 in different stages of removing and replacing the closure, FIGURE 11 is similar to FIGURE 8 but illustrates a modification, FIGURES 12 and 13 are similar to FIGURES 8 and 9 but illustrate a further modification, FIGURES 14 and 15 are also similar to FIGURES 8 and 9 but illustrate yet another modification, FIGURE 16 is a partial section illustrating a modified form of locking formation, FIGURE 17 is a partial section illustrating another modified form of locking formation, FIGURE 18 is a section through another form of closure, FIGURE 19 is a section through a closure similar to that shown in FIGURE 1 but including a modification, FIGURE 20 is a section through the neck of a container, similar to the container shown in FIGURES 3 and 4 but including a modification, and FIGURE 21 is a section through yet another form of closure.

The closure shown in FIGURES 1 and 2 comprises a hollow cap with a cylindrical side wall 30 and a flat circular top 31. Two sets of inwardly facing locking formations are provided on the side wall 30, the sets being similar to each other and being disposed diametrically opposite to each other. Each set comprises an arcuate band 32, of uniform radial thickness, extending from the open mouth of the cap towards the top 31. That edge of the band facing the top is formed to provide a part-helical ramp 33 extending from the mouth of the cap, a short face 34 in a plane containing the axis of the closure and directed away from the ramp, and an inclined face 35 substantially parallel with the ramp 33. The part of the band with the inner portion of the ramp 33 constitutes the spigot 36 of the locking formation. A resilient plate 37 of circular shape is provided on a central stem 38 which projects inwards from the top of the cap, the edge of the plate being close to the side wall 30. The plate 37 forms a seal for the closure as described below, and constitutes the resilient means referred to above.

The closure is formed of a suitable resilient plastics material and is moulded in two parts, one comprising the side wall 30 and the locking formations, and the other comprising the top 31, the stem 38 and the plate 37. Each part can readily be formed in a simple two-part mould. The parts can be secured by an adhesive or by solvent-welding but are preferably secured by spin-welding or ultra-sonic welding.

The closure may be used to close the mouth of a container having a neck of the kind shown in FIGURES 3 and 4. The neck of the container is of generally cylindrical shape, and is of a size such that it can just enter the closure inside the bands on which the locking formations are formed. Complementary sets of locking formations are formed on the outside of the neck of the container, these constituting the retaining means referred to above. The locking formations are preferably formed integrally with the container, for example when the container consists of a moulded glass bottle the locking formations are preferably formed in the moulding operation. There are two similar and diametrically opposed sets of locking formations on the neck, each set comprising a band 39 of uniform radial thickness equal to that of the bands 32 on the closure. That edge face of each band 39 which faces away from the mouth of the container is formed with a row of teeth, with saw-tooth profiles, defining between them a row of sockets 40. The end tooth at one end of the band is extended towards the mouth of the container to form a ramp 41, while the end tooth at the other end is extended away from the mouth, to an extent such as to enable its inclined surface to engage that of the corresponding ramp 33 on the closure. Beyond this latter tooth is a stop 42 which extends away from the mouth in an axial direction. The socket next to the stop, which has the reference numeral 43, is the locking socket referred to above.

The operation of the closure will now be described with reference to FIGURES 1 to 4 and FIGURES 8 to 10, these latter figures being developed views illustrating the shape of the locking formations and their inter-engagement. The formations are given the same reference numerals as those in FIGURES 1 to 4. When the closure is placed on the container the bands 32 on the closure can enter the gaps between the bands 39 on the container, but the extent to which they can enter is initially limited by the engagement between the lip of the container and the marginal part of the plate 37. The position of one band 32 relative to the bands 39 in this stage is indicated by the dotted lines 44 in FIGURE 10. The closure is then rotated to bring the ramps 33 into engagement with the ramps 41. Further rotation draws the closure further onto the container and causes resilient deformation of the plate 37. Each spigot 36 passes the various sockets 40 in turn and, unless the closure is pressed against the resilient action of the plate 37, enters each socket. Rotation of the closure can continue until the spigots 36 enter the locking sockets 43, as indicated by the dotted lines 45 in FIGURE 10, further rotation being prevented by the engagement of the ends of the bands 32 with the stops 42. Even when the spigots 36 are in a socket the plate 37 is still deformed to some extent.

To remove the closure it is necessary to push the closure against the resilient action of the plate 37, so as to withdraw the spigots 36 from the locking sockets 43 and to rotate the closure until the bands 32 are again aligned with the gaps between the bands 39. Unless the closure is pushed well in and the bands 32 take up the position illustrated by the dotted lines 25 in FIGURE 10 each spigot will engage one of the sockets 40 and continued rotation in that sense will be prevented by the face 34 engaging the corresponding face at one side of the socket. The stops 42 extend sufficiently far from the mouth of the container to ensure that the bands 32 cannot be moved past them even when the closure is pushed onto the container as far as is possible.

Although the bands 32 are shown as being on the closure and the bands 39 as being on the container their positions may be reversed if desired. This is also true of the modifications described below.

Instead of the retaining means constituted by the bands 39 being on the container they may be provided on a separate component adapted to be secured to a container. Such a component is shown in FIGURE 5 and comprises a short tube 26, with the bands at one end, formed internally with a screw-thread 46 so that it can be screwed onto the externally screw-threaded neck of a container. The form and dimensions of the thread 46 are such that when the component is in place it cannot be removed without considerable force. Similarly, a considerable force would be required to screw it onto the container, and this may be applied during assembly by a suitable machine. The component is of particular use in modifying existing containers to take closures embodying the invention.

In the closures thus far described with reference to the drawings the locking formations have been directed inwards. In other arrangements, however, they are directed outwards, and the complementary locking formations are directed inwards. Such an arrangement is shown in FIGURES 6 and 7. The closure shown in FIGURE 6 has side walls 47 and a top 48 with a projecting stem 49 somewhat similar to the corresponding parts of the closure shown in FIGURES 1 and 2. In place of the plate, however, there is a ring 50 of resilient, compressible material which constitutes the spring means; and the locking formations 51 are on the outside of the stem 49. In shape the locking formations 51 are similar to those on the bands 32, and they co-operate with complementary locking formations 52 on the inside of the neck 53 of the container shown in FIGURE 7. The formations 52 are similar to those on the bands 39.

Although the spigot 36 is associated with a ramp 33 and a further tooth on the side opposite the ramp these features are not essential to the functioning of the invention and either or both may be omitted. FIGURE 11 shows locking formations 54 comprising spigots alone, these being capable of use in place of the bands 32.

A modification of the arrangement shown in FIGURES 8 and 9 is shown in FIGURES 12 and 13. Here the row of sockets 27 is part-helical, and the formations on the complementary band 28 correspondingly shaped. In use as the spigot is moved from socket to socket to or toward the locking socket the closure is drawn more closely onto the container, and as the spigot reaches each successive socket the deformation of the spring means is increased.

In each of the constructions thus far described the spigot and sockets are formed with complementary inclined faces which engage each other in use. With such an arrangement if the spigot is in any socket other than the locking socket the closure can be rotated in a direction such as to carry the spigot to or towards the locking socket. If a child manages to move the closure in such a manner as to transfer the spigot from the locking socket to a neighbouring socket any subsequent attempt to rotate the closure may well return the spigot to or towards the locking socket, thus rendering the closure more secure again.

Another modification, which does not embody this feature, is illustrated in FIGURES 14 and 15. Here the closure is provided with two diametrically opposed rectangular spigots 29, and the container, or component, is provided with two bands 56 each provided with a row of rectangular sockets 57 terminating in a stop 58.

A modified form of spigot is also shown in FIGURE 16 which shows part of the cylindrical side wall 59 of a closure, and a spigot band 60 similar to the band 32 in FIGURE 1 but tapered as viewed from the end of the closure. This arrangement may assist in the removal of the closure from the mould in cases where the closure is moulded in one piece. In such a case, after moulding, part of the mould projects into the closure, and the spigots enter said part. With tapered spigots it is possible to rotate the closure relatively to said part of the mould, thereby forcing the spigot formation outwards from said part of the mould until they are clear of it and the closure can be pulled from the mould. This arrangement is of course only possible when the closure is made from resilient material.

FIGURE 17 illustrates another modification of the shape of the locking formations which may be adopted. There is shown part of a closure 61 with locking formations 62, and part of a container, or components 63, with locking formations 64. The mutually engaging faces of the locking formations 62 and 64 are undercut so that any attempt to disengage the spigot by relative radial movement with respect to the rotational axis of the closure would initially draw the closure 61 further onto the container, or component, against the action of the spring means.

In other forms of closure the stem and plate of the kind shown in FIGURES 1 and 2 are not used and are replaced by a layer of resilient material, and a circular plate which may or may not be resilient as desired, the layer of resilient material being disposed in the main part of the closure between the plate and the top of the closure. The resilient layer and the plate may be separately formed and may be secured in place with an adhesive or may merely be prevented from escape by the engagement between the margin of the plate and the locking formations. Alternatively the layer of resilient material may be formed unitarily with the main part of the closure or the plate or both, the resilient material comprising a suitable plastics material incorporating a foaming agent, and the components formed unitarily with it comprising the plastics material with no foaming agent. The components are moulded successively in a suitable mould, there being some relative movement between the parts of the mould between the or each pair of successive moulding operations to afford space for the introduction of additional material during the second such operation. In alternative arrangements the plate is omitted. A typical closure is shown in FIGURE 18. Here there is shown a closure generally similar to that shown in FIGURES 1 and 2, comprising a cylindrical side wall 65, a top 66 and locking formations 67. The top 66 is formed on its inner surface with an integral layer 68 of resilient foam material.

Containers with closures in accordance with the invention are useful for containing liquids which give off vapours or gases, e.g. petrol and mineral waters. If pressure rises in the container the plate or like member is forced from its engagement with the end of the neck of the container or component allowing vapour or gas to escape. The arrangement may be such that a seal forms again when the pressure is reduced. Should the pressure in the container fall after the container is sealed by the closure it may be difficult subsequently to remove the closure. Further, the plate or like member may become partially sucked into the container. To avoid this difficulty formations such as pips or grooves may be provided on or in the container and/or the plate or flange such as to prevent a seal being formed when the plate or flange is sucked into the container beyond a certain point.

Examples are shown in FIGURES 19 and 20. FIGURE 19 is a section through a closure similar to that shown in FIGURES 1 and 2 but having a pip 69 at one edge of the plate. FIGURE 20 is a section through the neck of a bottle similar to that shown in FIGURES 2 and 3 but having a pip 70 immediately inside the mouth.

FIGURE 21 illustrates two other features which may be employed. The figure is a cross section through a closure generally similar to that shown in FIGURES 1 and 2 but in which the plate 71 is formed with a stud 72 which is a snap engagement with a socket 73 formed on the inside of the top of the closure. In addition the marginal portion 74 of the plate 71 is tapered, being inclined outwardly and away from the mouth of the closure, and the outer face of the plate 71 is concave. In use the marginal portion 74 enters the mouth of the container or component, and as the centre of the plate is pushed further towards the mouth the plate becomes resiliently deformed so that the outer face thereof becomes less concave and the marginal portion presses outwards to form a seal.

I claim:

1. A closure for a container and a container neck formation of the kind having two sets of locking formations, one set on the closure and one set on the neck formation, the sets of locking formations being capable of mutual engagement to retain the closure in a closed position on the neck formation and capable of mutual disengagement to permit the removal of the closure from the neck formation, one set of locking formations comprising a spigot and the other set of locking formations presenting a row of sockets comprising a locking socket which is engaged by the spigot when the closure is in its closed position and outer socket means comprising at least one outer socket which the spigot must pass on rotation of the closure from its closed position to a release position in which it can be removed from the neck formation, and spring means operative to urge the spigot into any socket with which it is in register, wherein the improvement comprises the provision of abutment faces on the spigot and the locking socket shaped to abut each other to prevent the movement of the closure from its closed position by the application to the closure of torque alone [and in the absence of the application of an axial force to move the closure against the action of the spring means and thus to remove the spigot from the locking socket] *but by the application of an axial force to move the closure against the action of the spring means thus removing the spigot from the locking socket and thereafter applying torque, allowing the removal of the closure from the container.*

2. A closure for a container and a container neck formation, according to claim 1 in which the spigot and the outer socket means are provided with abutment faces shaped so that when the spigot engages the outer socket means and a torque is applied to the closure in a sense such as to urge the spigot towards the locking socket the abutment faces engage in a cam-like manner and cause the spigot to be withdrawn from the outer socket means against the action of the spring means, but when a torque is applied to the closure in a sense such as to urge the spigot away from the locking socket other abutment faces engage to prevent rotation of the closure relatively to the neck formation.

3. A closure for a container and a container neck formation, according to claim 1 in which the closure is made from a plastics material and the sets of formations are both undercut whereby any attempt to disengage the spigot from a socket by relative radial movement with respect to the rotational axis of the closure would initially draw the closure further onto the container neck formation against the action of the spring means.

4. A closure for a container and a container neck formation, according to claim 1 in which the closure is formed as a unitary whole from a plastics material and comprises a top, side walls on which is provided one of two sets of locking formations, and a resilient sealing member constituting said spring means.

5. A closure for a container and a container neck formation, according to claim 4 in which the closure is formed as a moulding from a plastics material and the spring means comprises a layer of resilient foam plastics material formed integrally with the top.

References Cited

The following references, cited by the Examiner, are of record in the patented file of this patent or the original patent.

UNITED STATES PATENTS

| | | | |
|---|---|---|---|
| 890,302 | 6/1908 | Roediger | 215—44 |
| 1,581,723 | 4/1926 | Dorn | 220—40 |
| 1,715,146 | 5/1929 | Pletcher | 220—40 |
| 2,235,101 | 3/1941 | Enkur | 215—56 |
| 2,339,702 | 1/1944 | Isele | 215—40 |
| 2,776,066 | 1/1957 | Thornton | 215—9 XR |
| 2,980,276 | 4/1961 | Robineau | 215—56 |
| 3,261,895 | 7/1966 | Strickman | 215—40 X |

FOREIGN PATENTS

| | | |
|---|---|---|
| 547,660 | 5/1956 | Belgium. |
| 672,348 | 10/1963 | Canada. |
| 251,745 | 5/1926 | Great Britain. |
| 522,646 | 4/1955 | Italy. |

DONALD F. NORTON, Primary Examiner